(12) United States Patent
Tamper et al.

(10) Patent No.: US 12,516,355 B2
(45) Date of Patent: Jan. 6, 2026

(54) PRODUCTION OF MONO-ETHYLENE GLYCOL

(71) Applicant: UPM-Kymmene Corporation, Helsinki (FI)

(72) Inventors: Juha Tamper, Levänen (FI); Sami Turunen, Lappeenranta (FI); Vilho Nissinen, Vehkataipale (FI); Mika Laitila, Hämeenlinna (FI); Jere Salminen, Lappeenranta (FI); Meri Ventola, Leipzig (DE); Nina Heiming, Xanten (DE); Lisa Weigand, Wiesbaden (DE)

(73) Assignee: UPM-Kymmene Corporation, Helsinki (FI)

( * ) Notice: Subject to any disclaimer, the term of this patent is extended or adjusted under 35 U.S.C. 154(b) by 527 days.

(21) Appl. No.: 17/792,987

(22) PCT Filed: Jan. 8, 2021

(86) PCT No.: PCT/FI2021/050008
§ 371 (c)(1),
(2) Date: Jul. 14, 2022

(87) PCT Pub. No.: WO2021/144499
PCT Pub. Date: Jul. 22, 2021

(65) Prior Publication Data
US 2023/0063154 A1 Mar. 2, 2023

(30) Foreign Application Priority Data
Jan. 15, 2020 (FI) .................................... 20205037

(51) Int. Cl.
| | |
|---|---|
| C12P 7/10 | (2006.01) |
| B09B 3/45 | (2022.01) |
| B09B 3/60 | (2022.01) |
| B27K 5/04 | (2006.01) |
| B27L 11/02 | (2006.01) |
| C12N 9/24 | (2006.01) |
| C12P 19/14 | (2006.01) |

(52) U.S. Cl.
CPC .............. C12P 7/10 (2013.01); C12N 9/2402 (2013.01); *C12P 2201/00* (2013.01)

(58) Field of Classification Search
CPC ... C12P 7/10; C12P 19/14; B27K 5/04; B27K 5/001; B27L 11/02; B09B 3/45; B09B 3/60; B01J 23/89
See application file for complete search history.

(56) References Cited

U.S. PATENT DOCUMENTS

| 4,461,648 A | 7/1984 | Foody |
|---|---|---|
| 10,053,745 B2 * | 8/2018 | Kilambi ............... C13K 13/002 |
| 2008/0275277 A1 | 11/2008 | Kalagias |
| 2012/0323051 A1 | 12/2012 | Powell |
| 2015/0057469 A1 | 2/2015 | Zhang |
| 2016/0052843 A1 | 2/2016 | van der Heide |
| 2017/0121737 A1 | 5/2017 | Medoff |
| 2018/0340192 A1 | 11/2018 | Turunen et al. |
| 2020/0002778 A1 | 1/2020 | Kumar |

FOREIGN PATENT DOCUMENTS

| CN | 101132892 A | 2/2008 |
|---|---|---|
| CN | 102286548 B | 8/2013 |
| CN | 109896922 A | 6/2019 |
| JP | 2006075007 A | 3/2006 |
| JP | 2010115840 A | 5/2010 |
| JP | 2013512350 A | 4/2013 |
| JP | 2018502920 A | 2/2018 |
| WO | 2015124498 A1 | 8/2015 |

OTHER PUBLICATIONS

Fujimoto, J Research and development of pretreatment and glycosylation whooping techniques for gunocellulose, ASIT, 13(6):11 (2013).
Cullis, I. F. et al., "Effect of Initial Moisture Content and Chip Size on the Bioconversion Efficiency of Softwood Lignocellulosics," Biotechnology and Bioengineering, 85(4): 413-421, Jan. 2, 2003.
Pielhop, T. et al., "Steam explosion pretreatment of softwood: the effect of the explosive decompression on enzymatic digestibility," Biotechnol Bifuels, 9(152), Jul. 22, 2016.
Hartler, N., "Achievement and significance of optimal chip quality," Tappi Journal, 79(2): 259-264, Feb. 1996.
Garemark, J., "Studies of the Impregnation Stage in Kraft Pulping of Hardwood," Degree Project in Chemical Science and Engineering Second Cycle, KTH CBH, 2018.
Search Report in Finnish Patent Application No. FI 20205037, mailed Jun. 26, 2020 (2 pages).
(Continued)

*Primary Examiner* — Maryam Monshipouri
(74) *Attorney, Agent, or Firm* — Nixon Peabody LLP

(57) ABSTRACT

A method for producing mono-ethylene glycol (MEG) from a wood-based raw material, and wherein method includes: i) providing a wood-based feedstock originating from the wood-based raw material and including wood chips, wherein at most 5 weight-% of the wood chips in the wood-based feedstock are overthick wood chips as specified by SCAN-CM 40:01, and subjecting the wood-based feedstock to at least one pretreatment to form a liquid fraction and a fraction including solid cellulose particles; ii) subjecting the fraction comprising solid cellulose particles to enzymatic hydrolysis to form a lignin fraction and a carbohydrate fraction; iii) subjecting the carbohydrate fraction to catalytical conversion to form a liquid composition of glycols; and iv) recovering mono-ethylene glycol from the liquid composition of glycols. Further is disclosed a corresponding arrangement and mono-ethylene glycol obtainable by the method.

13 Claims, 4 Drawing Sheets

(56) References Cited

OTHER PUBLICATIONS

Opinion on Patentability in Finnish Patent Application No. FI 20205037, mailed Feb. 14, 2022 (7 pages).
International Search Report in International Patent Application No. PCT/FI2021/050008, mailed Apr. 8, 2021 (4 pages).
Wikipedia, "Ethylene glycol," retrieved from the internet on Jan. 5, 2022, available online at URL: https://en.wikipedia.org/wiki/Ethylene_glycol ; (13 pages).
Walker, J. C. F., *Primary Wood Processing: Principles and Practice*, $2^{nd}$ Edition, Chapter 14: "The Energy Sector: A Hidden Goliath," pp. 549-553, Springer, ISBN-13: 978-1-4020-4393-2, 2006.
Third Party Observation in International Patent Application No. PCT/FI2021/050008, mailed Jan. 8, 2021 (3 pages).

* cited by examiner

US 12,516,355 B2

PRODUCTION OF MONO-ETHYLENE GLYCOL

RELATED APPLICATIONS

This application is a U.S. National Stage of International Application No. PCT/FI2021/050008, filed on Jan. 8, 2021, which claims the benefit of Finnish Patent Application No. 20205037, filed on Jan. 15, 2020, each of which is hereby incorporated by reference in its entirety.

TECHNICAL FIELD

The present disclosure relates to a method for producing mono-ethylene glycol (MEG) from a wood-based raw material. The present disclosure further relates to an arrangement for producing mono-ethylene glycol (MEG) from a wood-based raw material. The present disclosure further relates to mono-ethylene glycol obtained by the method as described in the current specification.

BACKGROUND

Mono-ethylene glycol (MEG), also called ethylene glycol or 1,2-ethanediol, is an important liquid raw material finding use e.g. in the manufacturing of polyethylene terephthalate (PET) and polyester resins. Mono-ethylene glycol can be used for applications that require chemical intermediates for resins, solvent couplers, freezing point depression, solvents, humectants and chemical intermediates. The increasing use of mono-ethylene glycol in polyester fiber and polyethylene terephthalate industries is propelling the growth of the global mono-ethylene glycol market. Conventional methods for producing ethylene glycol involve the use of non-renewable resources. The inventors have thus recognized the need to provide a method for producing mono-ethylene glycol using bio-based materials.

SUMMARY

A method for producing mono-ethylene glycol from a wood-based raw material is disclosed. The method may comprise: i) providing a wood-based feedstock originating from the wood-based raw material and comprising wood chips, wherein at most 5 weight-% of the wood chips in the wood-based feedstock are overthick wood chips as specified by SCAN-CM 40:01, and subjecting the wood-based feedstock to at least one pretreatment to form a liquid fraction and a fraction comprising solid cellulose particles. The method may further comprise: ii) subjecting the fraction comprising solid cellulose particles to enzymatic hydrolysis to form a lignin fraction and a carbohydrate fraction. The method may further comprise: iii) subjecting the carbohydrate fraction to catalytical conversion to form a liquid composition of glycols. The method may further comprise iv) recovering mono-ethylene glycol from the liquid composition of glycols.

Further is disclosed an arrangement for producing mono-ethylene glycol from a wood-based raw material. The arrangement may comprise at least one pretreatment unit configured to subject wood-based feedstock originating from the wood-based raw material and comprising wood chips, wherein at most 5 weight-% of the wood chips in the wood-based feedstock are overthick wood chips as specified by SCAN-CM 40:01, to at least one pretreatment to form a liquid fraction and a fraction comprising solid cellulose particles. The arrangement may further comprise at least one hydrolysis reactor configured to subject the fraction comprising solid cellulose particles to enzymatic hydrolysis to form a lignin fraction and a carbohydrate fraction. The arrangement may further comprise a conversion reactor configured to subject the carbohydrate fraction to catalytical conversion to form a liquid composition of glycols. The arrangement may further comprise a distillation unit configured to recover monoethylene glycol from the liquid composition of glycols.

Further is disclosed mono-ethylene glycol produced by the method as described in the current specification.

BRIEF DESCRIPTION OF THE DRAWINGS

The accompanying drawings, which are included to provide a further understanding of the embodiments and constitute a part of this specification, illustrate various embodiments. In the drawings.

DETAILED DESCRIPTION

Figure 1:
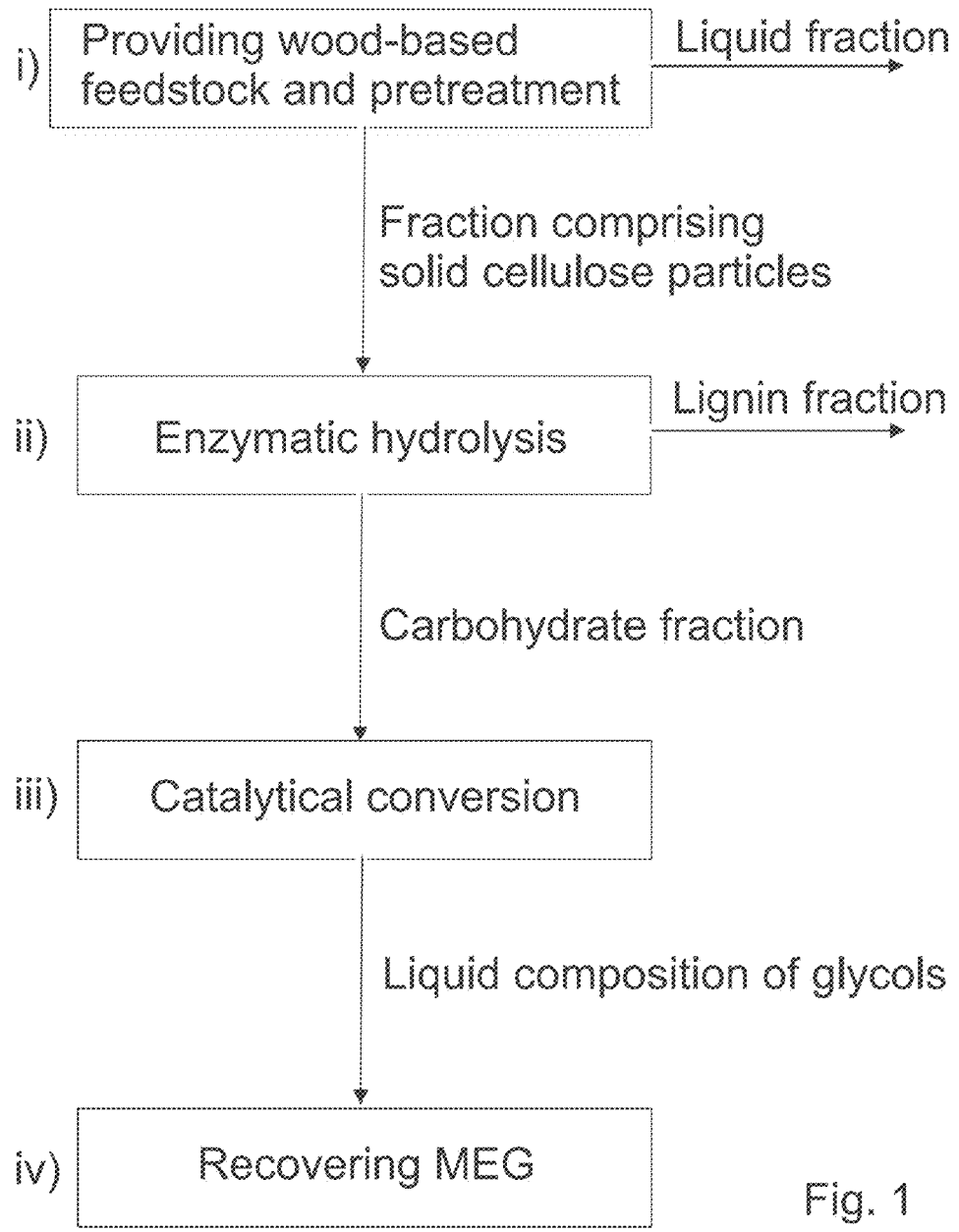
FIG. 1 presents a flow chart of one embodiment of the method for producing mono-ethylene glycol.

A method for producing mono-ethylene glycol (MEG) from wood-based raw material is disclosed. The method may comprise the following:

i) providing a wood-based feedstock originating from the wood-based raw material and comprising wood chips, wherein at most 5 weight-% of the wood chips in the wood-based feedstock are overthick wood chips as specified by SCAN-CM 40:01, and subjecting the wood-based feedstock to at least one pretreatment to form a liquid fraction and a fraction comprising solid cellulose particles;

ii) subjecting the fraction comprising solid cellulose particles to enzymatic hydrolysis to form a lignin fraction and a carbohydrate fraction;

iii) subjecting the carbohydrate fraction to catalytical conversion to form a liquid composition of glycols; and iv) recovering mono-ethylene glycol from the liquid composition of glycols.

Further is disclosed an arrangement for producing mono-ethylene glycol (MEG) from a wood-based raw material. The arrangement may comprise:

i) at least one pretreatment unit configured to subject wood-based feedstock originating from the wood-based raw material and comprising wood chips, wherein at most 5 weight-% of the wood chips in the wood-based feedstock are overthick wood chips as specified by SCAN-CM 40:01, to at least one pretreatment to form a liquid fraction and a fraction comprising solid cellulose particles;

ii) at least one hydrolysis reactor configured to subject the fraction comprising solid cellulose particles to enzymatic hydrolysis to form a lignin fraction and a carbohydrate fraction;

iii) a conversion reactor configured to subject the carbohydrate fraction to catalytical conversion to form a liquid composition of glycols; and iv) a distillation unit configured to recover mono-ethylene glycol from the liquid composition of glycols.

Further is disclosed monoehtylene glycol (MEG) obtained by the method as described in the current specification.

By the expression "pretreating" or "pretreatment" should be understood in this specification, unless otherwise stated, (a) process(es) conducted to convert wood-based feedstock to a fraction comprising solid cellulose particles. As a result of the pretreatment, in addition to the fraction comprising solid cellulose particles, a liquid fraction may be formed. The liquid fraction may be separated from the fraction comprising solid cellulose particles. The fraction comprising solid cellulose particles may further include an amount of lignocellulose particles as well as lignin particles in free form. Lignocellulose comprises lignin chemically bonded to the cellulose particles. The wood-based raw material may be selected from a group consisting of hardwood, softwood, and their combination. The wood-based raw material may e.g. originate from pine, poplar, beech, aspen, spruce, eucalyptus, ash, or birch. The wood-based raw material may also be any combination or mixture of these. The wood-based raw material may be broadleaf wood. Preferably the wood-based raw material is broadleaf wood due to its relatively high inherent sugar content, but the use of other kinds of wood is not excluded. The broadleaf wood may be selected from a group consisting of beech, birch, ash, oak, maple, chestnut, willow, poplar, and any combination of mixture thereof.

Providing the wood-based feedstock in step i) may comprise subjecting wood-based raw material to a mechanical treatment selected from debarking, chipping, dividing, cutting, beating, grinding, crushing, splitting, screening, and/or washing the wood-based raw material to form the wood-based feedstock.

The arrangement may comprise a mechanical unit configured to subject wood-based raw material to a mechanical treatment selected from debarking, chipping, dividing, cutting, beating, grinding, crushing, splitting, screening, and/or washing the wood-based raw material to form the wood-based feedstock.

Thus, providing the wood-based feedstock originating from the wood-based raw material may comprise subjecting the wood-based raw material to a mechanical treatment to form a wood-based feedstock. The mechanical treatment may comprise debarking, chipping, dividing, cutting, beating, grinding, crushing, splitting, screening, and/or washing the wood-based raw material. During the mechanical treatment e.g. wood logs can be debarked and/or wood chips of the specified size and structure can be formed. The formed wood chips can also be washed, e.g. with water, in order to remove e.g. sand, grit, and stone material therefrom. Further, the structure of the wood chips may be loosened before the pretreatment step. The wood-based feedstock may contain a certain amount of bark from the wood logs.

Providing the wood-based feedstock may comprise purchasing the wood-based feedstock. The purchased wood-based feedstock may comprise purchased wood chips or sawdust that originate from wood-based raw material.

In one embodiment, the specific surface area (SSA) of the wood chips is 2-35 cm$^2$/g, or 4-33 cm$^2$/g, or 6-30 cm$^2$/g, or 10-25 cm$^2$/g, or 12-20 cm$^2$/g.

The specific surface area (SSA) of the wood chips may be measured by application of water on the surface of wood chip pieces and by measuring the mass of this water (SSA measured by liquid adsorption method). On the basis of the mass of water applied it is possible to calculate the mean specific surface area of the chip pieces per specific mass of dry matter. The chips are soaked before measurement in order to reach the cell wall saturation point. This prevents the water to be applied from being absorbed in the wood material. After soaking, the surfaces of the wood chip pieces are dewatered by centrifugation. The mass of the centrifuged wood chip pieces is weighed. After this, an aqueous film is applied on the surface of the chip pieces by immersing the wood chip pieces in water. The chip pieces having been moistened this way are weighed again. The mass of water applied can be calculated from the difference between the masses of wood chip pieces having a dry surface and coated with the aqueous film. After this, the wood chip pieces are dried in order to find out the amount of dry matter in the sample. The specific surface area is calculated based on the ratio between the mass of water applied on the surface of the wood chip pieces and the amount of dry matter in the wood chip pieces. The calculation is performed by using the below presented formula. Thus, the specific surface area may be determined in the following manner: A well-mixed sample is weighed in an amount of 100 g by wet weight in a metal basket. The numbered metal basket is placed in a plastic bucket which has been filled with water at room temperature. It is confirmed that all chip pieces lie under the surface of water. The sample is soaked for at least 8 hours, most preferably overnight, for the wood cell walls and the cell lumens to be filled with water. This way, no water will be absorbed in them at a later time to influence the specific surface area results. After soaking, the sample is placed in a centrifuge bag at standardized moisture. The moisture of the centrifuge bag is standardized by immersing the bag in water before each of the sample points and by centrifuging it for 2 minutes. The sample is centrifuged for 4 minutes. The sample is weighed in the basket (weight 1.) at a precision of 0.01 g. The weighing result is recorded. The weighed sample is re-immersed in water for 2 minutes, ensuring that all chip pieces are under water. After this, the sample is drained in the basket over the bucket for 30 seconds. The wet chips are moved to a tared drying vessel and weighed (weight 2.) at a precision of 0.01 g, and the weighing result is recorded. The sample is dried in a thermal cabinet at 105±2° C. overnight. After drying, the sample is weighed (weight 3.). The weighing result is recorded. The results are calculated according to the following formula $g_{water}/g_{od\_wood}$ (grams of applied water per grams of dry matter):

$$g_{water}/g_{od\_wood} = (g_{wet} - g_{dry})/d_{od\_wood}$$

wherein $g_{dry}$=weight 1. (g)
$g_{wet}$=weight 2. (g)
$g_{od\_wood}$=weight 3. (g)

The result is calculated as an average of two parallel measurements. By calculation, the measurement results are converted to grams of applied water per grams of dry matter. The result in grams of water per grams of dry matter ($g_{water}/g_{od\_wood}$) is converted to the specific surface area (SSA) according to the following formula:

$$SSA[cm^2/g_{od\_wood}] = 26,531*(g_{water}/g_{od\_wood})^2 + 113, 86*(g_{water}/g_{od\_wood}) - 19,718$$

In one embodiment, the geometrical specific surface area (GSSA) of the wood chips is 4-40 cm$^2$/g, or 5-35 cm$^2$/g, or 6-30 cm$^2$/g, or 10-25 cm$^2$/g, or 12-20 cm$^2$/g.

The geometrical specific surface area (GSSA) may be measured as below described: Firstly the size distribution of wood chips is measured according to SCAN-CM 40:01:

| Size class | Fraction % |
| --- | --- |
| Size class over 45 mm % | F1 |
| Size class overthick 45-8 mm % | F2 |
| Size class 8-13 mm % | F3 |
| Size class 13-7 mm % | F4 |
| Size class 7-3 mm % | F5 |
| Size class fines <3 mm % | F6 |

Figure 4:
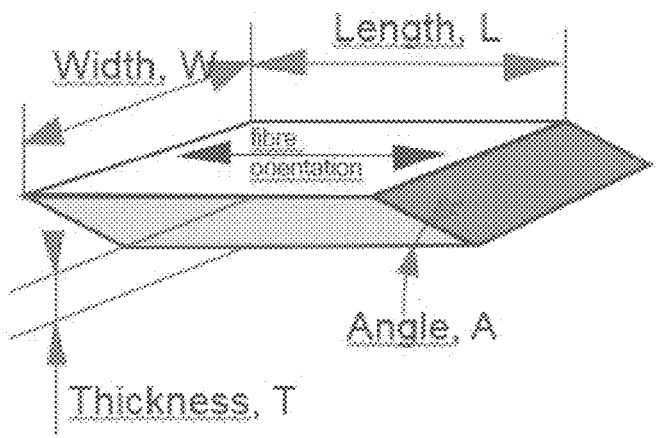
FIG. 4 presents the measurements conducted when measuring the geometrical specific surface area (GSSA).

Then, 50 pieces of wood chips are randomly selected from each accepted fraction and the following dimensions of each wood chip is measured as presented in FIG. 4. Mass weighted average of wood chip length, and width of each fraction according to SCAN-CM 48:01 (revised 2001) are measured. The wood chips are classified to 15 classes within each fraction, and the mass weighted the average of length and width calculated:

| Length class | Fraction % |
| --- | --- |
| <10 | L1 |
| 10.1-13 | L2 |
| 13.1-16 | L3 |
| 16.1-19 | L4 |
| 19.1-22 | L5 |
| 22.1-25 | L6 |
| 25.1-28 | L7 |
| 28.1-31 | L8 |
| 31.1-34 | L9 |
| 34.1-37 | L10 |
| 37.1-40 | L11 |
| 40.1-43 | L12 |
| 43.1-46 | L13 |
| 46.1-49 | L14 |
| >49 | L15 |

| Width class | Fraction % |
| --- | --- |
| <10 | W1 |
| 10.1-13 | W2 |
| 13.1-16 | W3 |
| 16.1-19 | W4 |
| 19.1-22 | W5 |
| 22.1-25 | W6 |
| 25.1-28 | W7 |
| 28.1-31 | W8 |
| 31.1-34 | W9 |
| 34.1-37 | W10 |
| 37.1-40 | W11 |
| 40.1-43 | W12 |
| 43.1-46 | W13 |
| 46.1-49 | W14 |
| >49 | W15 |

Then the wood chip thickness of each wood chip is measured by accuracy of 0.1 mm and the wood chips are classified to 15 classes, i.e. T1, T2 . . . T15, from thinnest to thickest, and the thickness average of each class and weight the mass of each class are calculated the same way as in the SCAN-CM 48:01. The mass weighted average of the thickness is calculated.

Then the cutting angle of 10 chips from each fraction is measured and the average, An, of the angles is calculated.

Figure 5:
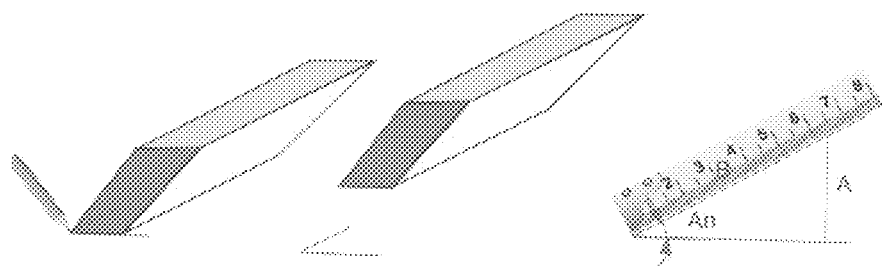
FIG. 5 presents the measurements conducted when measuring the geometrical specific surface area (GSSA).

Then the angle of each wood chip is measured as presented in FIG. 5 by taking a wood chip, drawing the cutting angle onto a paper; lengthening the sides of the angle and forming a right-angled triangle, the bigger the more accurate; measuring the opposite face and hypotenuse of the triangle; and calculating the angle from the equation $An = \arcsin(A/B)$ Then the geometrical specific surface area (GSSA) of each fraction can be calculated by the equation:

$$GSSAn = 20000 * (Wn*Ln + Tn*Ln + Wn*Tn/\sin(An))/(Ln*Wn*Tn*BD)$$

wherein
$GSSAn$=specific surface area of the fraction Fn, [cm2/g]
$Wn$=mass weighted average of chip width in the fraction Fn, [mm]
$Ln$=mass weighted average of chip length in the fraction Fn, [mm]
$Tn$=mass weighted average of chip thickness in the fraction Fn, [mm]
$An$=average of the cutting angles of the chip in each fraction Fn, [radians]
$BD$=basic density of the wood, [kg dry wood/solid m3 of wet wood]

Then the mass weighted average of the geometrical specific surface area (GSSA) can be calculated by equation:

$$GSSA = (\Sigma(SSAn*Fn))/100$$

wherein
$GSSA$=geometrical specific surface area of the chips
$GSSAn$=mass weighted average of geometrical specific surface area of the fraction Fn, [cm$^2$/g]
$Fn$=mass fraction of the each size of chips classified according to the standard SCAN-CM 40:01

Figure 3:
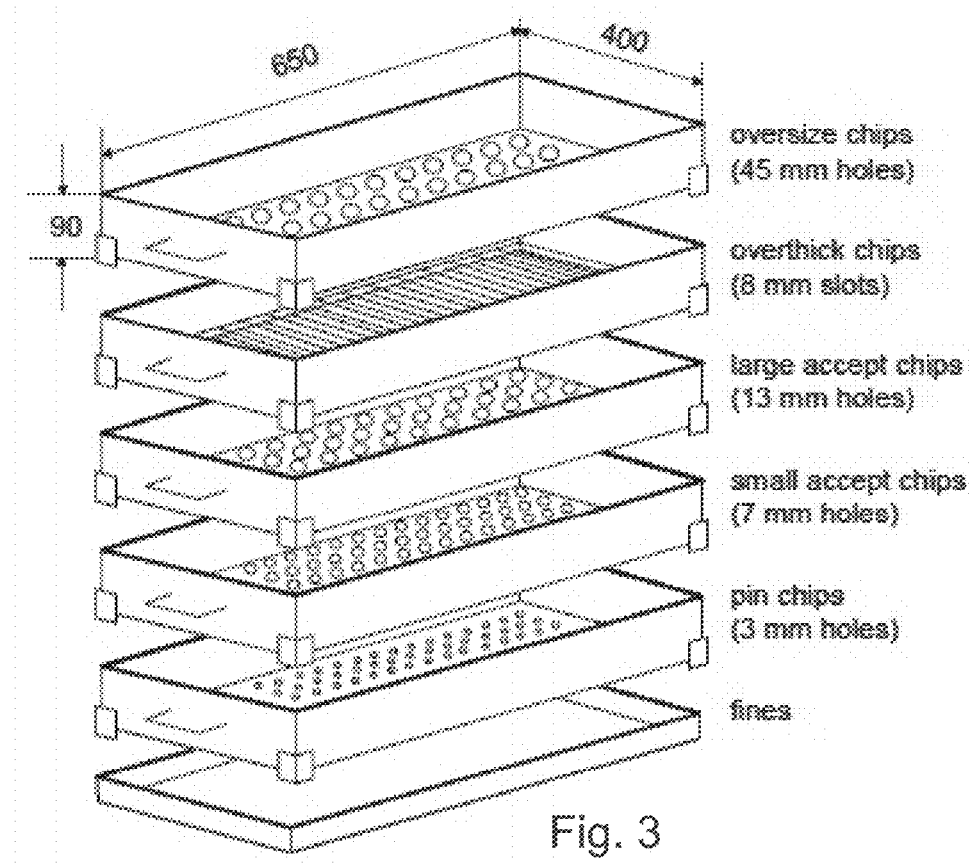
FIG. 3 presents the chip classifier presented in SCAN-CM 40:01.

The wood-based feedstock may comprise wood chips, wherein at most 5 weight-% of the wood chips in the wood-based feedstock are overthick wood chips as specified by SCAN-CM 40:01. The standard SCAN-CM 40:01 (version revised 2001) describes a manner for the classification of wood chips, wherein a sample of wood chips is placed on the top screen of a stack of five screen trays and a fines tray (see FIG. 3). The screens have holes or slots of specified dimensions and the stack is kept in a reciprocating motion. After a specified time, the screening is stopped and the six classes obtained are weighed separately. The size of each class is its mass, expressed as a percentage of the total mass of all six classes.

The feature that the wood chips in the wood-based feedstock are "overthick wood chips" should in this specification, unless otherwise stated, be understood as wood chips that pass the first screen of the chip classifier but are retained on the second screen comprising 8 mm slots, when chip size classification is performed as specified in SCAN-CM 40:01.

The feature that the wood chips in the wood-based feedstock are "fines" should in this specification, unless otherwise stated, be understood as wood chips that are not retained even on the fifth screen comprising 3 mm holes, when chip size classification is performed as specified in SCAN-CM 40:01.

In one embodiment, at most 3.5 weight-%, or at most 3 weight-%, or at most 2.5 weight-%, or at most 2 weight-% of the wood chips in the wood-based feedstock are overthick wood chips as specified by SCAN-CM 40:01.

In one embodiment, at most 10 weight-%, or at most 6 weight-%, or at most 3 weight-%, or at most 1.5 weight-%, or at most 0.5 weight-% of the wood chips in the wood-based feedstock are fines as specified by SCAN-CM 40:01.

In one embodiment, at most 3 weight-%, or at most 1 weight-%, or at most 0.5 weight-%, or at most 0.1 weight-%, or essentially 0 weight-%, of the wood chips in the wood-based feedstock are oversize wood chips as specified by SCAN-CM 40:01. I.e. oversize wood chips may be essentially removed from the wood-based feedstock. The feature that the wood chips in the wood-based feedstock are "oversize wood chips" should in this specification, unless otherwise stated, be understood as wood chips that do not pass the first screen comprising 45 mm holes, when chip size classification is performed as specified in SCAN-CM 40:01.

The inventors surprisingly found out that the impregnation liquid is more homogenously absorbed and impregnated into the feedstock comprising wood chips of the specified size when especially the amount of oversize wood chips is minimized and the amount of overthick wood chips in the feedstock is controlled.

Pretreatment in step i) of the wood-based feedstock may comprise one or more different pretreatment processes. During the different pretreatment processes the wood-based feedstock as such changes. The aim of the at least one pretreatment processes is to form a fraction comprising solid cellulose particles for further processing.

The pretreatment i) may comprise subjecting the wood-based feedstock to pre-steaming. The pretreatment i) may comprise subjecting the wood-based feedstock received from the mechanical treatment to pre-steaming. The pretreatment in i) may comprise, an impregnation treatment and/or a steam explosion and comprise, before subjecting the wood-based feedstock to impregnation treatment and/or to steam explosion, subjecting the wood-based feedstock to pre-steaming, wherein the pre-steaming of the wood-based feedstock is carried out with steam having a temperature of 100-130° C. at atmospheric pressure. During the pre-steaming the wood-based feedstock is treated with steam of low pressure. The pre-steaming may be also carried out with steam having a temperature of below 100° C., or below 98° C., or below 95° C. The pre-steaming has the added utility of reducing or removing air from inside of the wood-based feedstock.

The pre-steaming may take place in at least one pre-steaming reactor. In one embodiment, one of the at least one pretreatment units is a pre-steaming reactor configured to subject the wood-based feedstock to pre-steaming. In one embodiment, one of the at least one pretreatment units is a pre-steaming reactor operationally arranged before the impregnation reactor and/or the pressurized reactor and configured to subject the wood-based feedstock to pre-steaming with steam having a temperature of 100-130° C. at atmospheric pressure.

Further, i) of pretreatment may comprise subjecting the wood-based feedstock to at least one impregnation treatment with an impregnation liquid. The impregnation treatment may be carried out to the wood-based feedstock received from the mechanical treatment and/or from the pre-steaming. The pretreatment in i) may comprise, before subjecting to the steam explosion, subjecting the wood-based feedstock to at least one impregnation treatment with an impregnation liquid selected from water, at least one acid, at least one alkali, at least one alcohol, or any combination or mixture thereof.

The inventors surprisingly found out that the specified size range of the wood chips in the wood-based feedstock has the added utility of beneficially affecting the impregnation treatment. It was surprisingly found out that the impregnation liquid may be more evenly distributed and absorbed into the wood chips when using the specified size of the wood chips.

The wood-based feedstock may be transferred from the mechanical treatment and/or from the pre-steaming to the impregnation treatment with a feeder. The feeder may be a screw feeder, such as a plug screw feeder. The feeder may compress the wood-based feedstock during the transfer. When the wood-based feedstock is then entering the impregnation treatment, it may become expanded and absorbs the impregnation liquid.

The impregnation liquid may comprise water, at least one acid, at least one alkali, at least one alcohol, or any combination or mixture thereof. The at least one acid may be selected from a group consisting of inorganic acids, such as sulphuric acid (H2SO4), nitric acid, phosphoric acid; organic acids, such as acetic acid, lactic acid, formic acid, carbonic acid; and any combination or mixture thereof. In one embodiment, the impregnation liquid comprises sulphuric acid, e.g. dilute sulphuric acid. The concentration of the acid may be 0.3-5.0% w/w, 0.5-3.0% w/w, 0.6-2.5 w/w, 0.7-1.9% w/w, or 1.0-1.6% w/w. The impregnation liquid may act as a catalyst in affecting the hydrolysis of the hemicellulose in the wood-based feedstock. In one embodiment, the impregnation is conducted by using only water, i.e. by autohydrolysis. In one embodiment, the wood-based feedstock may be impregnated through alkaline hydrolysis. NaOH and Ca2(OH)3 can be mentioned as examples to be used as the alkali in the alkaline hydrolysis.

One of the at least one pretreatment units may be an impregnation reactor configured to subject the wood-based feedstock to at least one impregnation treatment with an impregnation liquid. One of the at least one pretreatment units may be an impregnation reactor operationally arranged before the pressurized reactor and configured to subject the wood-based feedstock to at least one impregnation treatment with an impregnation liquid selected from water, at least one acid, at least one alcohol, or any combination or mixture thereof. The impregnation treatment may thus be conducted in at least one impregnation reactor or vessel. In one embodiment, two or more impregnation reactors are used.

The transfer from one impregnation reactor to another impregnation reactor may be carried out with a feeder, such as a screw feeder. The feeder may together with steam even out liquid concentration differences within the wood chips whereby the impregnation liquid may easier penetrate the wood chips.

The impregnation treatment may be carried out by conveying the wood-based feedstock through at least one impregnation reactor, i.e. the wood-based feedstock may be transferred into the impregnation reactor, interspersed inside the impregnation reactor, and transferred out of the impregnation reactor such that the wood-based feedstock is homogenously impregnated with the impregnation liquid. The impregnation treatment may be carried out as a batch process or in a continuous manner.

The residence time of the wood-based feedstock in an impregnation reactor, i.e. the time during which the wood-based feedstock is in contact with the impregnation liquid, may be 5 seconds-5 minutes, or 0.5-3 minutes or about 1 minute. The temperature of the impregnation liquid may be e.g. 20-99° C., or 40-95° C., or 60-90° C. Keeping the temperature of the impregnation liquid below 100° C. has the added utility of hindering or reducing hemicellulose from dissolving.

After the impregnation treatment, the wood-based feedstock may be allowed to stay in e.g. a storage tank or a silo for a predetermined period of time to allow the impregnation liquid absorbed into the wood-based feedstock to stabilize. This predetermined period of time may be 15-60 minutes, or e.g. about 30 minutes.

Pretreatment i) may comprise subjecting the wood-based feedstock to steam explosion. The wood-based feedstock from the mechanical treatment, the pre-steaming step, and/or from the impregnation treatment may be subjected to steam explosion. In one embodiment, i) of pretreatment comprises at least one of mechanical treatment of wood-based material to form wood-based feedstock, pre-steaming of the wood-based feedstock, impregnation treatment of the wood-based feedstock, and steam explosion of the wood-based feedstock. In one embodiment, i) of pretreatment comprises mechanical treatment of wood-based material to form a wood-based feedstock, the pre-steaming of the wood-based feedstock, impregnation treatment of the wood-based feedstock, and the steam explosion of the wood-based feedstock. In one embodiment, i) of pretreatment comprises pre-steaming the wood-based feedstock, impregnation treatment of the wood-based feedstock, and steam explosion of the wood-based feedstock. In one embodiment, i) of pretreatment comprises impregnation treatment of the wood-based feedstock, and steam explosion of the wood-based feedstock. I.e. the wood-based feedstock having been subjected to the impregnation treatment may thereafter be subjected to the steam explosion. Also, the wood-based feedstock having been subjected to pre-steaming, may then be subjected to the impregnation treatment and thereafter the wood-based feedstock having been subjected to the impregnation treatment may be subjected to steam explosion.

The wood-based feedstock can be stored in e.g. chip bins or silos between the different treatments. Alternatively, the wood-based feedstock may be conveyed from one treatment to the other in a continuous manner.

The pretreatment in i) may comprise subjecting the wood-based feedstock to steam explosion that is carried out by treating the wood-based feedstock with steam having a temperature of 130-240° C. under a pressure of 0.17-3.25 MPaG followed by a sudden, explosive decompression of the wood-based feedstock. The wood-based feedstock may be treated with the steam for 1-20 minutes, or 1-20 minutes, or 2-16 minutes, or 4-13 minutes, or 3-10 minutes, or 3-8 minutes, before the sudden, explosive decompression of the wood-based feedstock.

In this specification, the term "steam explosion" may refer to a process of hemihydrolysis in which the wood-based feedstock is treated in a reactor with steam having a temperature of 130-240° C. under a pressure of 0.17-3.25 MPaG followed by a sudden, explosive decompression of the wood-based feedstock that results in the rupture of the fiber structure of the wood-based feedstock.

The steam explosion process may be conducted in a pressurized reactor. I.e. one of the at least one pretreatment units may be a pressurized reactor configured to subject wood-based feedstock originating from the wood-based raw material to steam explosion. The steam explosion may be carried out in the pressurized reactor by treating the wood-based feedstock with steam having a temperature of 130-240° C. under a pressure of 0.17-3.25 MPaG followed by a sudden, explosive decompression of the wood-based feedstock. The wood-based feedstock may be introduced into the pressurized reactor with a compressing conveyor, e.g. a screw feeder. During transportation with the screw feeder, if used, part of the impregnation liquid absorbed by the wood-based feedstock is removed as a pressate while some of it remains in the feedstock. The wood-based feedstock may be introduced into the pressurized reactor along with steam and/or gas. The pressure of the pressurized reactor can be controlled by the addition of steam. The pressurized reactor may operate in a continuous manner or as a batch process. The wood-based feedstock, e.g. the wood-based feedstock that has been subjected to an impregnation treatment, may be introduced into the pressurized reactor at a temperature of 25-140° C. The residence time of the wood-based feedstock in the pressurized reactor may be 0.5-120 minutes. The term "residence time" should in this specification, unless otherwise stated, be understood as the time between the wood-based feedstock being introduced into or entering e.g. the pressurized reactor and the wood-based feedstock being exited or discharged from the same.

As a result of the hemihydrolysis of the wood-based feedstock affected by the steam treatment in the reactor, the hemicellulose present in the wood-based feedstock may become hydrolyzed or degraded into e.g. xylose oligomers and/or monomers. Thus, steam explosion of the wood-based feedstock may result in the formation of an output stream. The output stream from the steam explosion may be subjected to steam separation. The output stream from the steam explosion may be mixed or combined with a liquid. The output stream of the steam explosion may be mixed with a liquid to form a liquid fraction and a fraction comprising solid cellulose particles. The liquid may be pure water or water containing C5 sugars. The water containing C5 sugars may be recycled water from separation and/or washing the fraction comprising solid cellulose particles before enzymatic hydrolysis. The output stream may be mixed with the liquid and the resulting mass may be homogenized mechanically to break up agglomerates.

The liquid fraction may comprise sugars from hydrolyzed hemicellulose as well as soluble lignin and other by-products. In one embodiment, the liquid fraction comprises carbohydrates, such as C5 sugars (C5H10O5 or (C5(H2O)n). The liquid fraction may comprise carbohydrates, such as monosaccharides (C6H12O6 or C5H10O5), disaccharides (C12H22O11), oligosaccharides and/or polysaccharides ((C6H10O5)n or (C5H8O4)n). In one embodiment, the liquid fraction comprises soluble C5 carbohydrates (C5H10O5 or C5(H2O)n) and other carbohydrates. The liquid fraction may comprise also other components.

The fraction comprising solid cellulose particles may, in addition to cellulose, comprise lignin. In one embodiment, the fraction comprising solid cellulose particles comprises carbohydrates, e.g. solid C6 carbohydrates (C6H12O6 or C6(H2O)n), and lignin. The fraction comprising solid cellulose particles may also comprise other carbohydrates and other components.

The method may comprise separating and recovering the liquid fraction and the fraction comprising solid cellulose particles formed in i) before ii). The separated or recovered fraction comprising solid cellulose particles may be washed before being subjected to enzymatic hydrolysis in ii). The fraction comprising solid cellulose particles may be diluted with water and/or other liquid containing at least soluble carbohydrates.

Step ii) of subjecting the fraction comprising solid cellulose particles to enzymatic hydrolysis may be carried out at a temperature of 30-70° C., or 35-65° C., or 40-60° C., or 45-55° C., or 48-53° C. Step ii) of subjecting the fraction comprising solid cellulose particles to enzymatic hydrolysis may be carried out at atmospheric pressure. The pH of the fraction comprising solid cellulose particles may be kept during ii) at a pH value of 3.5-6.5, or 4.0-6.0, or 4.5-5.5. The pH of the fraction comprising solid cellulose particles can be adjusted with the addition of alkali and/or acid. ii) of subjecting the fraction comprising solid cellulose particles to enzymatic hydrolysis may be continued for 20-120 h, or 30-90 h, or 40-80 h. The enzymatic hydrolysis of the fraction comprising solid cellulose particles may be carried out in a continuous manner or as a batch-type process or as a combination of a continuous and a batch-type process.

In one embodiment, the enzymatic hydrolysis is carried out at a temperature of 30-70° C., or 35-65° C., or 40-60° C., or 45-55° C., or 48-53° C. while keeping the pH of the fraction comprising solid cellulose particles at a pH value of 3.5-6.5, or 4.0-6.0, or 4.5-5.5, and wherein the enzymatic hydrolysis is allowed to continue for 20-120 h, or 30-90 h, or 40-80 h.

The enzymatic hydrolysis may be conducted in at least one process step.

In one embodiment, the enzymatic hydrolysis may be carried out as a one-step hydrolysis process, wherein the fraction comprising solid cellulose particles is subjected to enzymatic hydrolysis in at least one first hydrolysis reactor. After the hydrolysis, the hydrolysis product, i.e. the hydrolysate, may be subjected to a separation, wherein the solid lignin fraction, which in addition to lignin may also comprise non-hydrolyzed cellulose, is separated from the liquid carbohydrate fraction. The one-step hydrolysis process may be carried out as a batch process comprising e.g. several reactors working in parallel, wherein each reactor may receive a part of the fraction comprising solid cellulose particles. Further, separate parallel lines with parallel reactors may be used.

In one embodiment, the enzymatic hydrolysis may be carried out as a two-step hydrolysis process or as a multi-step hydrolysis process. In the two-step hydrolysis process or in the multi-step hydrolysis process the fraction comprising solid cellulose particles may first be subjected to a first enzymatic hydrolysis in at least one first hydrolysis reactor. Then the formed liquid carbohydrate fraction may be separated from the solid lignin fraction, which may also comprise unhydrolyzed cellulose. The solid fraction may then be subjected to a second or any latter enzymatic hydrolysis, e.g. in at least one second hydrolysis reactor. At least one of the first enzymatic hydrolysis and the second or any latter enzymatic hydrolysis may be carried out as a batch process or as a continuous process comprising e.g. one or several reactors working in parallel. After the second or any latter enzymatic hydrolysis, the hydrolysis product, i.e. the hydrolysate, may be subjected to separation, wherein the solid lignin fraction is separated from the liquid carbohydrate fraction.

The reaction time in the first hydrolysis reactor may be 8-72 hours. The reaction time in the second and/or any latter hydrolysis reactor may be 8-72 hours.

The enzymes are catalysts for the enzymatic hydrolysis. The enzymatic reaction decreases the pH and by shortening the length of the cellulose fibers it may also decrease the viscosity. Subjecting the fraction comprising solid cellulose particles to enzymatic hydrolysis may result in cellulose being transformed into glucose monomers with enzymes. Lignin present in the fraction comprising solid cellulose particles may remain essentially in solid form.

At least one enzyme may be used for carrying out the enzymatic hydrolysis. The at least one enzyme may be selected from a group consisting of cellulases, hemicellulases, laccases, and lignolytic peroxidases. Cellulases are multi-protein complexes consisting of synergistic enzymes with different specific activities that can be divided into exo- and endo-cellulases (glucanase) and β-glucosidase (cellobiose). The enzymes may be either commercially available cellulase mixes or on-site manufactured.

Cellulose is an insoluble linear polymer of repeating glucose units linked by β-1-4-glucosidic bonds. During the enzymatic hydrolysis, cellulose chains are broken by means of breaking at least one β-1-4-glucosidic bond.

Enzymatic hydrolysis may result in the formation of a lignin fraction and a carbohydrate fraction. In one embodiment, the carbohydrate fraction comprises C6 sugars (C6H12O6 or (C6(H2O))n). In one embodiment, the carbohydrate fraction comprises monosaccharides (C6H12O6 or C5H10O5), disaccharides (C12H22O11), oligosaccharides, and/or polysaccharides ((C6H10O5)n or (C5H8O4)n). In one embodiment, the carbohydrate fraction comprises galactose, glucose, mannose, arabinose, xylose, glucuronic acid and/or galacturonic acid.

The inventors surprisingly found out that the specified size range of the wood chips in the wood-based feedstock has the added utility of affecting the amount of the carbohydrate fraction that is received from the enzymatic hydrolysis.

In one embodiment, the lignin fraction is in solid form. In one embodiment, the carbohydrate fraction is in liquid form. The lignin fraction and the carbohydrate fraction formed in ii) may be separated and recovered before iii).

During the separation(s) conducted before ii) and/or before iii) the solid fraction may be separated from the liquid fraction. The separation(s) conducted before ii) and/or before iii) may be carried out by filtration and/or by centrifugal treatment. The filtration may be vacuum filtration, filtration based on the use of underpressure, filtration based on the use of overpressure, or filter pressing.

The carbohydrate fraction recovered from enzymatic hydrolysis may be purified before step iii). The purification of the carbohydrate fraction may be carried out by using at least one of the following: membrane filtration, crystallization, sterilization, pasteurization, evaporation, chromatography, ion exchanging, by active carbon. Purification of the carbohydrate fraction has the added utility of providing a desired target quality of sugars. The carbohydrate fraction may be subjected to iii) of catalytical conversion.

Catalytical conversion iii) of the carbohydrate fraction may comprise subjecting the carbohydrate fraction to catalytical hydrogenolysis. I.e. the carbohydrate fraction may be subjected to catalysts in the presence of hydrogen in step iii). The catalytical conversion may be carried out in the presence of water. In one embodiment, the catalytical conversion of the carbohydrate fraction comprises subjecting the carbohydrate fraction to catalytical hydrogenation in the presence of a solvent, preferably water and a catalyst system.

The catalytical conversion may be carried out in the presence of a catalyst system comprising one or more catalysts. In one embodiment, the catalyst system comprises or consists of a first catalyst. In one embodiment, the catalyst system comprises or consists of at least a first catalyst and at least a second catalyst. In one embodiment, the catalyst system comprises or consists of a first catalyst and a second catalyst. The first catalyst may be a heterogenous, solid catalyst. The second catalyst may be a homogenous catalyst. In one embodiment, the first and second catalysts may be heterogenous catalysts e.g. supported on a carrier.

The first catalyst may comprise an active metal component selected from Group 8, Group 9, or Group 10 of the IUPAC periodic table of elements such as iron, cobalt, nickel, ruthenium, rhodium, palladium, iridium, and platinum, or a mixture thereof. In one embodiment, the first catalyst comprises or consists of a heterogeneous Ni-alloy, such as Raney Nickel. The active metal component of the first catalyst may be supported by a carrier comprising activated carbon, alumina, silica, silicon carbide, zirconia, zinc oxide, titanium dioxide, or a mixture thereof. The active metal component of the first catalyst may account for 0.05-70 weight-% of the total weight of the catalyst.

The second catalyst may comprise at least one active component selected from tungsten oxide, tungsten sulfide, tungsten hydroxide, tungsten bronze oxide, tungsten acid, tungstate, metatungstate acid, metatungstate, paratungstate acid, para-tungstate, peroxotungstic acid, pertungstate, hetero-poly acid containing tungsten. In one embodiment, the second comprises or consists of homogenous sodium tungstate.

The first catalyst may be active in the hydrogenation. The second catalyst may be active in cracking.

In an embodiment the second catalyst is a homogenous catalyst and the second catalyst may be recovered and recycled to be reused in iii).

Step iii) of catalytical conversion of the carbohydrate fraction may be carried out at a temperature of 120-300° C., or 180-270° C., or 230-270° C. The initial pressure in room temperature in iii) may be 1-15 MPa, or 9-12 MPa. The catalytical conversion may be carried out in a continuous manner. The time that the carbohydrate fraction is subjected to catalytical conversion may be 5 minutes-3 hours, or 30 minutes-2.5 hours.

The catalytical conversion may take place in a conversion reactor, such as a fixed bed or a slurry reactor. The catalytical conversion of the carbohydrate fraction may take place as a slurry reaction. The hydrogen and the carbohydrate fraction may be added to the reactor separately or simultaneously using respective pumps and compressors. The second catalyst being in liquid form may be added to the reactor separately or simultaneously with the carbohydrate fraction. The first catalyst may be provided to the reactor separately from the carbohydrate fraction, preferably before the carbohydrate fraction is fed to the reactor. The liquid and gaseous reaction products comprising glycols may be removed from the reactor. The reaction products may be cooled and depressurized. After depressurizing, the gaseous products may be conducted to gas/liquid separation to separate the product comprising glycols in liquid form.

Subjecting the carbohydrate fraction to catalytical conversion iii) may thus result in a liquid composition of glycols. The catalytical conversion accomplishes at least hydrogenolation and hydrocracking reactions to achieve hydrogenolation and hydrocracking of the carbohydrate fraction such that a liquid composition of glycols is formed. The liquid composition of glycols may comprise or consist of mono-ethylene glycol (MEG, also called 1,2-ethanediol), monopropylene glycol (MPG, also called 1,2-propanediol) and 1,2-butane diol (BDO, also called butylene glycol). These glycols may be present at a concentration of 0.1-40 weight-% based on the total weight of the liquid composition of glycols. The liquid composition of glycols may also comprise other side products. The ethylene glycol reaction yield may be at least 60%.

Recovering mono-ethylene glycol from the liquid composition of glycols in step iv) may be conducted by a separation technique selected form adsorption, evaporation, distillation, extractive distillation, azeotrope distillation, vacuum distillation, atmospheric distillation, membrane separation, filtration, reactive purification or a combination of them In one embodiment, the mono-ethylene glycol is recovered by distillation. The distillation may be carried out in at least one distillation column. The distillation may be carried out at a temperature of 50-250° C., or of 100-200° C. The distillation may be carried out at a pressure of at least 0.1 kPa, or at least 10 kPa, or at least 50 kPa. The pressure may be at most 400 kPa, or at most 200 kPa, or at most 120 kPa.

It will be clear to the skilled person to vary the temperature and pressure in relation to each other in order to achieve suitable conditions.

MEG recovered in iv) may be subjected to an esterification reaction with terephthalic acid to form polyethylene terephthalate (PET). This esterification reaction can be conducted at a pressure of 0.27-0.55 MPa and a temperature of 220-260° C. Water that is formed during the reaction can be removed by distillation.

PET may be used to form a resin. The resin may be further processed into containers using e.g. injection molding or stretch blow molding.

The method as disclosed in the current specification has the added utility of making use of wood chips having the specified size range. The specified size of the wood chips has the added utility on beneficially affecting the impregnation treatment. The specified size of the wood chips has the added utility of making the impregnation treatment efficient, e.g. the impregnation liquid is evenly distributed over the wood chips and absorbed thereinto, whereby less impregnation liquid may be needed. Using wood chips of the specified chip size, has the added utility of making the method easier to control. By limiting the amount of overthick chips in the method, the formation of unhydrolyzed shives and sticks in the pretreatment i) may be reduced or minimized and the yield of the fraction comprising solid cellulose particles from pretreatment i) may be increased. This may then affect the yield of carbohydrate fraction received from the enzymatic hydrolysis ii) and further the yield of the glycols received from the catalytical conversion iii). The impregnation treatment as described in this specification then has the added utility of beneficially affecting the steam explosion such that a fraction comprising solid cellulose particles with a greater surface area may be achieved. Thus, the overall process for producing mono-ethylene glycol may be improved.

EXAMPLES

Reference will now be made in detail to the embodiments of the present disclosure, an example of which is illustrated in the accompanying drawings.

The description below discloses some embodiments in such a detail that a person skilled in the art is able to utilize the arrangement and its use, and the method based on the disclosure. Not all steps of the embodiments are discussed in detail, as many of the steps will be obvious for the person skilled in the art based on this disclosure.

For reasons of simplicity, item numbers will be maintained in the following exemplary embodiments in the case of repeating components.

Figure 2:
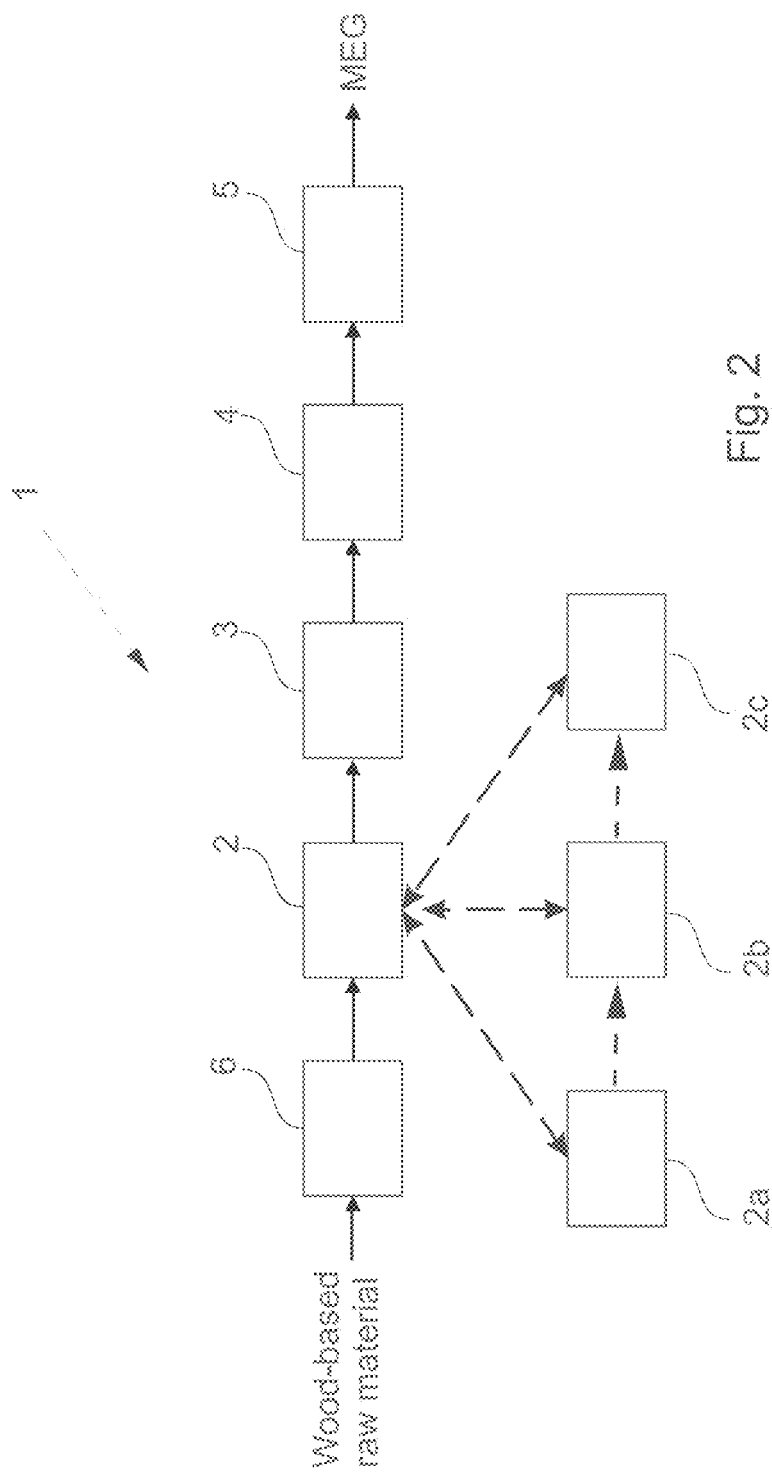
FIG. 2 presents one embodiment of the arrangement for producing mono-ethylene glycol.

The enclosed FIG. 1 and FIG. 2 illustrate an example of a flow chart of the method for producing mono-ethylene glycol and a corresponding arrangement 1 in some detail. The figures are not drawn to proportion, and many of the components of are omitted for clarity. The arrangement 1 of FIG. 2 for producing mono-ethylene glycol (MEG) from a wood-based raw material comprises at least one pretreatment unit 2 configured to subject wood-based feedstock originating from the wood-based raw material to at least one pretreatment to form a liquid fraction and a fraction comprising solid cellulose particles.

The arrangement of FIG. 2 further comprises a mechanical unit 6 configured to subject wood-based raw material to a mechanical treatment. The mechanical treatment may be selected from debarking, chipping, dividing, cutting, beating, grinding, crushing, splitting, screening, and/or washing the wood-based raw material to form the wood-based feedstock. The wood-based feedstock comprises wood chips, wherein at most 5 weight-% of the wood chips in the wood-based feedstock are overthick wood chips as specified by SCAN-CM 40:01.

One of the at least one pretreatment units 2 is a pressurized reactor 2c configured to subject wood-based feedstock originating from the wood-based raw material to steam explosion.

The arrangement disclosed in FIG. 2 further comprises impregnation reactor 2b operationally arranged before the pressurized reactor 2c. The impregnation unit 2b is configured to subject the wood-based feedstock to at least one impregnation treatment with an impregnation liquid. The impregnation liquid may be selected from water, at least one acid, at least one alkali, at least one alcohol, or any combination or mixture thereof.

The arrangement disclosed in FIG. 2 further comprises a pre-steaming reactor 2a operationally arranged before the impregnation reactor 2b and the pressurized reactor 2c. The pre-steaming unit is configured to subject the wood-based feedstock to pre-steaming.

The at least one pretreatment units may comprise at least one of the pre-steaming reactor 2a, the impregnation reactor 2b and the pressurized reactor 2c. Alternatively, the at least one pretreatment units may comprise two of these or all three of them one after the other.

After the pretreatment unit(s) is arranged at least one hydrolysis reactor 3. The at least one hydrolysis reactor 3 is configured to subject the fraction comprising solid cellulose particles to enzymatic hydrolysis to form a lignin fraction and a carbohydrate fraction.

The arrangement disclosed in FIG. 2 further comprises a conversion reactor 4 configured to subject the carbohydrate fraction to catalytical conversion to form a liquid composition of glycols.

The arrangement of FIG. 2 further comprises a distillation unit 5 configured to recover mono-ethylene glycol from the liquid composition of glycols.

Example 1—Effect of the Size of the Wood Chips in the Wood-Based Feedstock

In this example the effect of the specified size of the wood chips in the wood-based feedstock was tested. The wood-based feedstock was subjected to the pre-steaming followed by the impregnation treatment as described in the current specification. The impregnation treatment was conducted by using H2SO4 at the acid concentration of 13 g/l as the impregnation liquid. The temperature of the impregnation liquid was 90° C. The residence time was 1 minute. The results are presented in the below table 1.

TABLE 1

|  | Provided wood-based feedstock comprising wood chips |
|---|---|
| Dry matter content (Wood chips) % | 70.7 |
| Size class over 45 mm % | 0.0 |
| Size class overthick 45-8 mm % | 1.2 |
| Size class 8-13 mm % | 61.0 |
| Size class 13-7 mm % | 28.6 |
| Size class 7-3 mm % | 8.1 |
| Size class fines 3 mm % | 1.0 |
| Bulk Density (wood chips) kg/m$^3$ | 190 |
| Specific surface area (SSA) of chips cm$^2$/g | 10.6 |
| Geometrical specific surface area | 13.7 |

TABLE 1-continued (GSSA) of chips cm$^2$/g

|  | Provided wood-based feedstock comprising wood chips | After the impregnation treatment |
|---|---|---|
| Sulphur, S, ICP mg/kg | 82.5 | 2215 |
| Sulphur as Sulphuric acid, H$_2$SO$_4$, % w/w | 0.025%* | 0.670%* |
| Impregnated sulphuric acid, H$_2$SO$_4$, % w/w | 0% | 0.645% |

*the sulphuric acid content has been calculated from the amount of sulphur

From the above table 1 one can see that the sulphur content measured as ICP mg/kg (Inductively Coupled Plasma Optical Emission Spectrometry according to SFS-EN ISO 11885) has increased as a result of the impregnation treatment indicating that the impregnation liquid has been well impregnated.

It is obvious to a person skilled in the art that with the advancement of technology, the basic idea may be implemented in various ways. The embodiments are thus not limited to the examples described above; instead they may vary within the scope of the claims.

The embodiments described hereinbefore may be used in any combination with each other. Several of the embodiments may be combined together to form a further embodiment. A method, an arrangement, or the mono-ethylene glycol, disclosed herein, may comprise at least one of the embodiments described hereinbefore. It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items. The term "comprising" is used in this specification to mean including the feature(s) or act(s) followed thereafter, without excluding the presence of one or more additional features or acts.

The invention claimed is:

1. A method for producing mono-ethylene glycol (MEG) from a wood-based raw material, and wherein method comprises:
   i) providing a wood-based feedstock originating from the wood-based raw material and comprising wood chips, wherein at most 5 weight-% of the wood chips in the wood-based feedstock are overthick wood chips as specified by SCAN-CM 40:01 and wherein at most 10 weight-% of the wood chips in the wood-based feedstock are fines as specified by SCAN-CM 40:01, and subjecting the wood-based feedstock to at least one pretreatment to form a liquid fraction and a fraction comprising solid cellulose particles,
   wherein the overthick wood chips are wood chips that pass a first screen of a chip classifier but are retained on a second screen comprising 8 mm slots, when chip size classification is performed as specified in SCAN-CM 40:01, and wherein the fines are wood chips that are not retained even on a third screen comprising 3 mm holes, when chip size classification is performed as specified in SCAN-CM 40:01, and
   wherein the at least one pretreatment comprises subjecting the wood-based feedstock to at least one impregnation treatment with an impregnation liquid comprising water and at least one acid, and wherein the impregnation treatment is conducted in at least one impregnation reactor, wherein residence time of the wood-based feedstock in the impregnation reactor is 5 seconds-5 minutes and the temperature of the impregnation liquid is 20-99° C.;

ii) subjecting the fraction comprising solid cellulose particles to enzymatic hydrolysis to form a lignin fraction and a carbohydrate fraction;

iii) subjecting the carbohydrate fraction to catalytical conversion to form a liquid composition of glycols; and iv) recovering mono-ethylene glycol from the liquid composition of glycols.

2. The method of claim 1, wherein at most 3.5 weight-% of the wood chips in the wood-based feedstock are overthick wood chips as specified by SCAN-CM 40:01.

3. The method of claim 1, wherein the specific surface area (SSA) of the wood chips in the wood-based feedstock is 2-35 cm2/g.

4. The method of claim 1, wherein the geometrical specific surface area (GSSA) of the wood chips in the wood-based feedstock is 4-40 cm2/g.

5. The method of claim 1, wherein the wood-based raw material is broadleaf wood.

6. The method of claim 5, wherein the broadleaf wood is selected from beech, birch, ash, oak, maple, chestnut, willow, poplar, and any combination of mixture thereof.

7. The method of claim 1, wherein providing the wood-based feedstock comprises subjecting wood-based raw material to a mechanical treatment selected from debarking, chipping, dividing, cutting, beating, grinding, crushing, splitting, screening, and/or washing the wood-based raw material to form the wood-based feedstock.

8. The method of claim 1, wherein the pretreatment in i) comprises subjecting the wood-based feedstock to steam explosion that is carried out by treating the wood-based feedstock with steam having a temperature of 130-240° C. under a pressure of 0.17-3.25 MPaG followed by a sudden, explosive decompression of the wood-based feedstock.

9. The method of claim 1, wherein the pretreatment in i) comprises subjecting the wood-based feedstock to steam explosion after the impregnation treatment.

10. The method of claim 9, wherein the pretreatment in i) comprises, before subjecting to the impregnation treatment and/or to the steam explosion, subjecting the wood-based feedstock to pre-steaming, wherein the pre-steaming of the wood-based feedstock is carried out with steam having a temperature of 100-130° C. at atmospheric pressure.

11. The method of claim 1, wherein the enzymatic hydrolysis is carried out at a temperature of 30-70° C. while keeping the pH of the fraction comprising solid cellulose particles at a pH value of 3.5-6.5 and wherein the enzymatic hydrolysis is allowed to continue for 20-120 h.

12. The method of claim 1, wherein the catalytical conversion of the carbohydrate fraction comprises subjecting the carbohydrate fraction to catalytical hydrogenation in the presence of water and a catalyst system.

13. The method of claim 1, wherein recovering mono-ethylene glycol from the liquid composition of glycols is conducted by distillation of the liquid composition of glycols.

* * * * *